United States Patent [19]
Hoefer et al.

[11] Patent Number: 6,146,512
[45] Date of Patent: Nov. 14, 2000

[54] METHOD OF COATING ELECTRICALLY CONDUCTIVE SUBSTRATES

[75] Inventors: Rainer Hoefer, Duesseldorf; Heinz-Guenther Schulte, Muelheim/Ruhr; Harald Frommelius, Monheim, all of Germany

[73] Assignee: Henkel Kommanditgesellschaft auf Aktien, Germany

[21] Appl. No.: 09/194,825

[22] PCT Filed: May 22, 1997

[86] PCT No.: PCT/EP97/02621

§ 371 Date: Dec. 3, 1998

§ 102(e) Date: Dec. 3, 1998

[87] PCT Pub. No.: WO97/46628

PCT Pub. Date: Dec. 11, 1997

[30] Foreign Application Priority Data

Jun. 3, 1996 [DE] Germany .............. 196 22 221

[51] Int. Cl.[7] ................. C08F 2/58; C08K 3/20
[52] U.S. Cl. ............... 204/502; 523/412; 523/415
[58] Field of Search ................... 204/500, 501, 204/502; 523/412, 415

[56] References Cited

U.S. PATENT DOCUMENTS

| | | | |
|---|---|---|---|
| 4,036,795 | 7/1977 | Tominaga | 260/18 PN |
| 5,021,502 | 6/1991 | Patzschke et al. | 524/591 |
| 5,059,293 | 10/1991 | Sugishima et al. | 204/181.7 |
| 5,124,074 | 6/1992 | Uchiyama et al. | 252/358 |
| 5,451,305 | 9/1995 | Ott et al. | 204/181.7 |

FOREIGN PATENT DOCUMENTS

| | | |
|---|---|---|
| 0 109 760 | 5/1984 | European Pat. Off. . |
| 0 339 795 | 11/1989 | European Pat. Off. . |
| 0 339 795 A2 | 11/1989 | European Pat. Off. . |
| 0 536 166 | 4/1993 | European Pat. Off. . |
| 0 640 699 | 3/1995 | European Pat. Off. . |
| 25 41 234 | 4/1976 | Germany . |
| 34 36 345 | 4/1986 | Germany . |
| 39 41 018 | 6/1990 | Germany . |
| 06 045916 | 9/1987 | Japan . |
| 64-069678 | 3/1989 | Japan . |
| WO90/07967 | 7/1990 | WIPO . |

OTHER PUBLICATIONS

Journal of Coatings Technology, "Influence of Defoamers on the Efficiency of Waterborne Coating Systems" vol. 66, Feb. 1994, pp. 47–53.

"Elektrophorese Lacke" ,Kurt Weigel:Stuttgart (1967) pp. 197–199.

*Primary Examiner*—Kathryn Gorgos
*Assistant Examiner*—Thao Tran
*Attorney, Agent, or Firm*—John E. Drach; Real J. Grandmaison; Steven J. Trzaska

[57] ABSTRACT

A process for controlling foam in a water-based electrophoretic coating bath for coating an electrically conductive substrate wherein the bath contains at least one cathodically depositable synthetic resin by adding to the bath a polyalkylene oxide compound whose oxyalkyl groups contain 2 to 4 carbon atoms and the terminal OH groups are esterified with a carboxylic acid or etherified with an allyl or methyl aryl group and has a solubility of more than 50 parts by weight in 100 parts by weight of water at 25° C.

10 Claims, No Drawings

METHOD OF COATING ELECTRICALLY CONDUCTIVE SUBSTRATES

BACKGROUND OF THE INVENTION

1. Field of the Invention

This invention relates to a process for preventing foaming in cationic electrophoretic coating using special polyalkylene oxide compounds which have a solubility of more than 50 parts by weight in 100 parts by weight of water. The invention also relates to electrophoretic coating baths containing special polyalkylene oxide compounds which are distinguished by a particularly low tendency to foam on agitation.

2. Discussion of Related Art

The coating of conductive substrates by cataphoresis or even cathodic electrodeposition coating has been adopted in almost all areas of mass painting. In most countries, its main application is in the automotive industry where the major advantages of this coating process are particularly relevant. Thus, substantially defect-free uniform coatings can be obtained by dip coating and even the coating of voids is readily possible.

In cathodic electrodeposition coating (CEDC), the substrate is dipped into an aqueous bath, the so-called electrodeposition bath or ED bath, and connected as the cathode. By applying a direct current, the binder is then deposited from the bath onto the substrate. The binder thus deposited is then hardened by baking or other methods.

Cationic electrophoretic coating (CEC) installations are extended dip coating installations. The workpiece is provided with electrodes and coated in the dip tank over a contact time of about 1 to 4 minutes at voltages of 100 to 500 V and current densities of 0.01 to 5 A/dm$^2$. In the automotive industry, for example, the tank volumes are between 50 and 450 ton.

After returning to the surface, the coated objects pass through a rinse zone to remove any non-deposited lacquer film and then through blowing and drying zones.

The production and use of aqueous polymer systems is often accompanied by foaming. The foam is produced through the presence of surfactants and stabilized. Corresponding surface-active substances are present in virtually every water-based paint or lacquer formulation. Thus, this group of substances includes, for example, emulsifiers, wetting agents, dispersants and polymeric surfactants, such as for example the charged binders used in CEC coating compositions. Surfactants develop their effect by migrating to the phase interface between two generally immiscible or substantially immiscible components where they reduce surface tension. However, a side effect of this mechanism— necessary for the production of dispersions—is its tendency to stabilize and disperse trapped gas bubbles, especially air bubbles. Accordingly, the introduction of gases into a surfactant-containing solution often results in foaming. Foaming can take place in various ways, for example during production when the coating composition is thoroughly mixed or during the application of the coating composition. Thus, in the case of electrophoretic coating, air can be introduced in dispersed form, for example during the introduction or removal of the workpiece, during the washing of the workpiece and during filling of the dip tank with coating composition, often leading to the formation of a voluminous, stable foam in coating compositions known from the prior art.

Depending on the stability of the foam, foaming such as this can lead to unwanted effects, for example overflowing of the dip tank, surface soiling of the workpieces, uneven application of the paint and, hence, breaks in production.

This problem has been overcome by adding defoamers to coating compositions. A defoamer normally contains substances which intervene in the stabilizing mechanisms of the foam. The active substances normally used develop their effect by spreading out at the original phase interface as a result of their incompatibility. Another mechanism for destroying unwanted foam consists in the absorption of surfactants at the phase interface by introduction of hydrophobic silica. In many cases, a combination of these mechanisms is also achieved in mixed preparations. For example, aliphatic and aromatic mineral oils are used as carrier liquids for transferring active substances to the otherwise hydrophilic medium. The choice of these active substances is determined by the desired range of activity. Whereas a mineral-oil-based defoamer is suitable for low-gloss to medium-gloss acrylic or styrene/acrylic lacquers or for water-based emulsion polymers, defoamers of this type can cause a distinct reduction in gloss in high-gloss lacquers.

According to Journal of Coatings Technology, Vol. 66, 47 et seq. (February 1994), a defoamer must always have a certain degree of incompatibility with the medium to be defoamed because otherwise it will not migrate to the phase interface to destroy the foam micelle. However, the disadvantage of this incompatibility lies in the danger that surface defects, such as fish eyes and craters, can be formed by these very additives. Another problem caused by incompatibility lies in the complicated incorporation of the defoamer in the medium to be defoamed. In cases of high incompatibility, the defoamer has to be mechanically incorporated in the medium, the shear rate applied during preparation of the dispersion being a very important factor. At excessive shear rates, the defoamer droplets can become too small and lose their effect so that the defoamer has to be used in larger quantities. If the shear rate is too low, so that large defoamer droplets are produced, the resulting coating composition tends to form craters and to flow unevenly.

Accordingly, there is a need for a defoamer system which has a good defoaming effect, which does not adversely affect film formation on the surface to be coated and which can be incorporated without difficulty.

EP-B-339 795 describes a method for increasing the film thickness obtainable in electrophoretic coating. End-capped polyethers with a solubility in water of 0.1 to 50 parts by weight in 100 parts by weight of water are added as film-forming additives. According to the teaching of EP-B-339 795, film formation is disrupted by higher solubility values. This document has nothing to say about the incorporation behavior and foaming behavior of the coating compositions.

JP-B-06/045916 relates to a process for washing workpieces which have been painted by electrophoretic coating. The washing liquid used is the regenerated liquid obtainable after ultrafiltration of the bath contents which contains polypropylene glycol with a molecular weight of 500 to 1,500 in a quantity of 5 to 10,000 ppm as defoamer. The document in question does not mention the use of ethylene-oxide-containing copolymers in the coating composition itself.

JP-A-01/069678 relates to a process for improving the levelling of coatings obtainable by electrophoretic deposition. A polyalkylene glycol with a molecular weight of 1,500 to 6,000 is added to the coating composition in quantities of 0.25 to 7% by weight. The solubility of the polyalkylene glycol in water, the incorporation behavior of the flow controller and the foaming properties of the resulting solution are not mentioned.

WO 90/07967 discloses antifoam formulations containing 33 to 89% by weight of a $C_{16-22}$ fatty acid (mono-to-penta) ethoxylate or (mono-to-penta)propoxylate and 67 to 11% by weight of a block polymer of propylene oxide with ethylene oxide having a molecular weight of about 3800, a cloud point (expressed as 10% aqueous solution) of 9° C. to 13° C. and an HLB value of about 1 and their use in the paint-processing industry, more particularly in the painting of motor vehicles, for inhibiting foam in the circuit water of wet separators for spray painting installations.

U.S. Pat. No. 5,124,074 describes antifoam formulations containing a compound obtainable by reaction of special monosubstituted polyalkylene glycols containing oxyalkylene units with a polyepoxide compound containing a polyalkylene oxide unit.

The book entitled "Elektrophorese Lacke" (Kurt Weigel; Stuttgart 1967, pages 197–199) states: "To avoid unpleasant side effects, antifoam agents also have to be chosen with great care." (page 198, lines 2 to 4). In addition, it is emphasized that, in general, silicone defoamers are unsuitable in electrophoretic coating and that it is always important to ascertain which defoamer develops optimal activity for a certain system (page 198, first paragraph). These statements confirm the well-known fact that, because a certain class of compounds are suitable as defoamers in electrophoretic coating, this does not necessarily mean that other classes of compounds are fit for the same purpose. In particular, it is clear to the expert from the cited work that a given compound with a certain basic defoaming effect is not automatically suitable as an antifoam agent in cathodic electrophoretic coating.

DESCRIPTION OF THE INVENTION

The problem addressed by the present invention was to provide substances which would be capable of guaranteeing effective defoaming in cationic electrophoretic coating. The usual quality features of cationic electrophoretic coatings, particularly their favorable film formation, would not be adversely affected by the use of these substances.

It has now been found that special polyethers, especially those of which the OH groups are partly or completely capped by suitable reagents and which have a solubility in water of more than 50 parts by weight in 100 parts by weight water, guarantee excellent defoaming properties in typical electrophoretic coating baths.

In a first embodiment, the present invention relates to a process for coating electrically conductive substrates, in which the substrate is immersed in a water-based electrophoretic coating bath containing at least one cathodically depositable synthetic resin, the substrate is connected as the cathode, a film is deposited on the substrate by application of direct current, the substrate is removed from the electrophoretic coating bath and the deposited lacquer film is baked, polyalkylene oxide compounds with a solubility of more than 50 parts by weight in 100 parts by weight of water being added to the bath to control foaming.

In the context of the invention, polyalkylene oxide compounds are understood to be polyalkylene glycols of which the oxyalkyl groups contain 2 to 4 carbon atoms and which contain free terminal OH groups and/or terminal groups esterified with carboxylic acids or etherified with alkyl or aryl groups. These substances are referred to hereinafter as PAO compounds, PAO being the abbreviation for polyalkylene oxide. Accordingly, the PAO compounds are, on the one hand, polyalkylene glycols themselves, i.e. OH— terminated compounds, and also compounds derived therefrom in which the terminal OH groups are completely or partly capped by esterification or etherification. As already mentioned, however, only those PAO compounds with a solubility of more than 50 parts by weight in 100 parts by weight of water are used in accordance with the invention. PAO compounds with a solubility of 55 to 100 parts by weight in 100 parts by weight of water are preferred.

The hydroxyfunctional PAO compounds include, for example, those obtainable by statistical or blockwise addition of a mixture of ethylene oxide and propylene oxide onto monohydric or polyhydric alcohols. Suitable alcohols are, for example, any hydroxyfunctional aliphatic and/or aromatic hydrocarbons, ethers, amines, amides, ketones or esters. Particularly preferred alcohols are primary alcohols containing 1 to 36 carbon atoms, for example methanol, ethanol, propanol, isopropanol, n-butanol, isobutanol, tert.butanol, n-pentanol, isopentanol, hexanol, 2-ethylhexanol. In addition to the saturated, linear or branched alcohols, unsaturated alcohols, such as allyl alcohol, butenyl alcohol, pentenyl alcohol and higher homologs and isomers thereof, may also be used in accordance with the invention.

However, particularly preferred alcohols are monohydric alcohols obtainable by reduction of the esters of natural fatty acids, typical examples are caproic alcohol, caprylic alcohol, 2-ethylhexyl alcohol, capric alcohol, lauryl alcohol, isotridecyl alcohol, myristyl alcohol, cetyl alcohol, palmityl alcohol, palmitoleyl alcohol, stearyl alcohol, isostearyl alcohol, oleyl alcohol, elaidyl alcohol, petroselinyl alcohol, linolyl alcohol, linolenyl alcohol, elaeostearyl alcohol, arachyl alcohol, gadoleyl alcohol, behenyl alcohol, erucyl alcohol and brassidyl alcohol and the technical mixtures thereof obtained, for example, in the high-pressure hydrogenation of technical methyl esters based on fats and oils or aldehydes from Roelen's oxosynthesis and as monomer fraction in the dimerization of unsaturated fatty alcohols.

Suitable polyhydric alcohols are those with a functionality of around 2 to 10, including for example ethylene glycol, propylene glycol, butylene glycol, glycerol, oligoglycerol and polyglycerol, trimethylol propane, sorbitol, pentaerythritol, natural fats and oils bearing hydroxy groups and/or derivatives thereof, transesterification products of naturally occurring oils and fats with polyhydric alcohols and also glycosides. Low molecular weight dihydric to tetrahydric alcohols containing up to 6 carbon atoms, for example ethylene glycol, propylene glycol and/or glycerol, are preferably used for the purposes of the invention.

The non-end-capped block copolyadducts of, in particular, ethylene oxide and propylene oxide, for example, are suitable for obtaining a particularly good defoaming effect in accordance with the invention.

These block copolymers are produced by methods known per se, preferably under pressure and at elevated temperature, for example 80 to 200° C. and preferably 100 to 180° C., in the presence of acidic or basic catalysts. Acidic catalysts are, for example, the Lewis acids known to the expert, such as boron trifluoride or aluminium chloride. Preferred catalysts are alkaline catalysts such as, for example, the alcohols, hydroxides, oxides, carbonates, hydrides or amides of alkali or alkaline earth metals. Particularly preferred catalysts are the alcoholates, for example the methylates or ethylates, and the hydroxides of lithium, sodium and/or potassium.

The composition of the block copolymers in regard to the contents of ethylene oxide and propylene oxide units can vary within wide limits. Thus, the ratio of ethylene oxide to propylene oxide units may be between 1:10 and 10:1.

However, the hydroxyfunctional compounds mentioned may also be esterified with carboxylic acids and/or carboxylic anhydrides to cap the OH group. The esterification reaction may be carried out with aliphatic or aromatic carboxylic acids containing 2 to 18 carbon atoms, for example acetic acid, propanoic acid, butyric acid, valeric acid, caproic acid, oenanthic acid, caprylic acid, pelargonic acid, decanoic acid, lauric acid, myristic acid, palmitic acid or stearic acid.

The esterification of the carboxylic acids may be carried out in known manner in the presence of acidic catalysts. Suitable acidic catalysts are, for example, sulfuric acid, methanesulfonic acid, p-toluene sulfonic acid or surface-active sulfonic acids. Tin grindings have also been successfully used as the catalyst. The esterification reaction may be carried out at temperatures of 80° C. to 120° C. and is preferably carried out at temperatures of 90° C. to 110° C. If desired, the acidic catalyst may be neutralized and/or removed on completion of the esterification reaction. The ratio of OH groups to carboxylic acid may be adjusted to such a value that, for example, only partial esterification takes place. However, preferred products are those of which the OH groups are completely esterified. Particularly preferred products are esters of ethoxylation and/or propoxylation products of monohydric or dihydric alcohols.

Instead of esterification, etherification may also be selected as the end-capping reaction. To this end, the hydroxyfunctional compounds mentioned are reacted with aromatic or aliphatic, linear or branched alkyl halides preferably containing 4 to 8 carbon atoms under the conditions of Williamson's ether synthesis. Examples of such alkyl halides are, for example, methyl chloride, n-butyl chloride, sec.butyl bromide, tert.butyl chloride, amyl chloride, tert.amyl bromide, n-hexyl chloride, n-heptyl bromide, n-octyl chloride and benzyl chloride. In this way, the terminal OH groups of monohydric or polyhydric alcohols can be both partly and completely etherified. To obtain complete etherification, it may be advisable to use the alkyl halide and alkali in excess.

The use of the PAO compounds according to the invention provides for the extremely effective control of foaming in electrophoretic coating baths coupled with excellent film formation. In addition, it has been found that the PAO compounds to be used in accordance with the invention are very easy to incorporate in standard electrophoretic coating baths, in other words they are compatible with the components present in such baths.

PAO compounds most particularly preferred for the purposes of the invention are characterized by general formula (I):

$$R^1\text{—O—}(CH_2CH_2O)_n\text{—}R^2 \qquad (I)$$

in $R^1$ is a linear or branched alkyl or alkenyl radical containing 8 to 18 carbon atoms, $R^2$ is an alkyl radical containing 4 to 8 carbon atoms and n is a number of 7 to 30. PAO compounds corresponding to general formula (I), in which $R^2$ is an n-butyl radical, are most particularly preferred for the purposes of the invention.

The PAO compounds are preferably used in electrophoretic coating baths in a quantity corresponding to 0.01 to 15% by weight, based on the solids content of the electrophoretic coating bath. Quantities of 0.1 to 3% by weight and, more especially, 0.15 to 2% by weight are particularly preferred. Within these quantity ranges, the aim should be to use the lowest effective concentration of defoamer.

The present invention also relates to electrophoretic coating baths containing as defoaming component compounds corresponding to general formula (I):

$$R^1\text{—O—}(CH_2CH_2O)_n\text{—}R^2 \qquad (I)$$

in $R^1$ is a linear or branched alkyl or alkenyl radical containing 8 to 18 carbon atoms, $R^2$ is an alkyl radical containing 4 to 8 carbon atoms and n is a number of 7 to 30.

The electrophoretic coating baths according to the invention may contain any of the usual binders, crosslinking agents, pigments, catalysts and additives.

Electrophoretic coating baths normally contain as binder a cationic resin depositable by electric current which is responsible for the film-forming properties of the coating composition. Binders such as these are normally obtained by mixing a reaction product of an epoxy resin of the bisphenol A/epichlorohydrin type and primary and/or secondary amine and/or amide with an isocyanate compound containing optionally masked isocyanate groups. The isocyanate groups may be masked by methods known to the expert. In principle, any masking agents suitable for polyisocyanates, for example linear optionally branched aliphatic or cycloaliphatic monohydric alcohols containing 1 to 12 carbon atoms, may be used for masking. These masking agents may even be technical alcohol cuts in the form of mixtures of two or more of the alcohols mentioned above. Basically, the alcohols used do not have to be monohydric and may even be polyhydric alcohols of which the OH groups—except for one—are capped by esterification, etherification, acetalization, intermolecular and intramolecular cyclization or other reactions leading to the same result. Examples of such alcohols are methanol, ethanol, propanol, butanol, pentanol, 2-ethylhexanol, trimethylol propane diethyl ether, trimethylol propane diallyl ether, pentaerythritol triallyl ether, hexanol, heptanol and isodecanol.

So far as the polyamines and polyamides suitable for use in accordance with the invention are concerned, there are no limits to the reaction conditions under which they are produced in cases where they are formed by a reaction product of a basic amino compound and an epoxy resin. The epoxy resins used are, in particular, epoxy resins obtainable from phenolic compounds and epichlorohydrin which usually have a molecular weight of around 400 to 2,000. Typical examples of such resins are the reaction products of bisphenol A and epichlorohydrin, bisphenol A and β-methyl epichlorohydrin or polyglycidyl ethers of novolak resins. Examples of the basic amino compounds to be reacted with the epoxy resin are aliphatic or alicyclic amino compounds containing a primary or secondary amino group. Preferred examples are monoamines, for example mono- or dialkylamine, mono- or dialkanolamines and polyamines, for example polyalkylene polyamines. Suitable monoamines are mono- or dialkylamines containing around 1 to 18 carbon atoms, for example ethylamine, propylamine, butylamine, diethylamine, dipropylamine and other homologous or isomeric substances. Examples of mono- or dialkanolamines are ethanolamine, propanolamine, butanolamine, diethanolamine, dipropanolamine, ethanol propanolamine and other pure and/or mixed homologs and/or isomers. Other suitable monoamines are, for example, piperidine, cyclohexylamine, pyrrolidine and morpholine. Examples of suitable polyamines are ethylenediamine, hexamethylenediamine, diethylenetriamine, triethylenetetramine, tetraethylenepentamine, propylenediamine, dipropylenetriamine, tripropylenetetramine, butylenediamine, monoethyl ethylenediamine, diethyl aminopropylenediamine, hydroxyethyl aminopropylamine, monomethyl aminopropylamine, piperazine, N-methyl piperazine and N-aminoethyl piperazine. Aliphatic monoamines or polyamines containing a secondary amino group may also be used for the production of corresponding resins.

The reaction of the epoxy resins with one or more of the basic amino compounds is generally carried out simply by mixing the components at room temperature. However, the reaction system may also be heated to a temperature of 50 to 150° C. in order to accelerate the reaction. The amino compound is normally added to the epoxy resin in such a quantity that gelation is avoided.

The resin-like binder is generally made soluble or dispersible in water by neutralization with an acid. Such acids as, for example, formic acid, acetic acid, propionic acid, hydroxyacetic acid, lactic acid, hydrochloric acid, sulfuric acid or phosphoric acid are normally used for neutralization, organic acids, particularly lactic acid, being preferred. The acids are preferably used in such a quantity that the number of neutralized groups per molecule is sufficient to enable the binder to be at least dispersed in water or an aqueous solvent. The neutralization value of the acid used to protonate the binder is generally between about 5 and 40 mg of KOH per gram of resin solids, a range of 10 to 20 mg generally being preferred in regard to electrocoagulation behavior.

Water or a mixture of water and an organic solvent is normally used as the solvent. Suitable organic solvents are those low molecular weight types which preferably have unlimited or substantially unlimited miscibility with water, for example ethanol, propanol, isopropanol, isobutanol, ethylene glycol or ethylene glycol monomethyl ether. The solvent may be used in a quantity of 0 to 50% by weight, based on the quantity of water, and is preferably used in a quantity of 5 to 20% by weight. Examples of processes for the production of such binders can be found, for example, in DE-C-25 41 234, EP-B-536166, DE-A-39 41 018 and DE-A-34 36 345. The PAO compounds according to the invention may also be added to the binders during or after their production.

The electrophoretic application results in coagulation of the binder at the cathode at which a strongly basic layer is formed when electrical current is applied. By virtue of the electro-osmotic processes which accompany the deposition process, the coating can normally be handled shortly after deposition.

Known processes for the cathodic deposition of the described resins from aqueous dispersions may also be applied in the case of the binder preparations according to the invention. To this end, the conductive substrate is used as the cathode while a plate of stainless steel or carbon is used as the anode. There are no limits to the deposition conditions insofar as the necessary parameters for producing a uniform crater-free film with the required levelling properties and mechanical properties can be varied within wide limits in dependence upon the external conditions, for example the design features of the installation. Typical conditions are voltages of 100 to 500 V and current densities of 0.01 to 5 A/dm$^2$ over a contact time of about 1 to 4 minutes. The area ratio of the electrodes is normally between 1:2 and 2:1 for an electrode interval of 10 to 100 cm. Deposition of the binder is generally accompanied by stirring of the bath.

The deposited coating composition may be hardened by stoving, preferably after removal of non-coagulated binder in a preliminary washing step. To improve impact strength for example, the epoxy resin may optionally be modified with $C_{6-24}$ and preferably $C_{12-22}$ fatty acids or the isocyanate compound may be modified with alcohols, for example polyether polyols.

Suitable isocyanate-bearing molecules are both the low molecular weight aliphatic and/or aromatic diisocyanates and the so-called "chain-extended" isocyanates obtainable by reactions with preferably dihydric alcohols.

Examples of suitable isocyanates are 1,5-naphthylene diisocyanate, 4,4'-diphenylmethane diisocyanate (MDI), hydrogenated MDI ($H_{12}$ MDI), xylylene diisocyanate (XDI), tetramethyl xylene diisocyanate (TMXDI), di- and tetraalkyl diphenylmethane diisocyanate, 4,4'-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanatocyclohexane, 1,6-diisocyanato-2,2,4-trimethyl hexane, 1-isocyanatomethyl-3-isocyanato-1,5,5-trimethyl cyclohexane, chlorinated and brominated diisocyanates, phosphorus-containing diisocyanates, tetramethoxybutane-1,4-diisocyanate, tetramethylene-1,4-diisocyanate, pentamethylene-1,4-diisocyanate, hexamethylene-1,4-diisocyanate (HDI), phthalic acid-bis-(isocyanatoethyl ester), dicyclohexylmethane diisocyanate, 1,12-diisocyanatododecane and dimer fatty acid diisocyanate.

Dimer fatty acid is a mixture of predominantly $C_{36}$ carboxylic acids prepared by thermal or catalytic dimerization of unsaturated $C_{18}$ monocarboxylic acids, such as oleic acid, tall oil fatty acid or linoleic acid. The dimer fatty acid may be reacted to form dimer fatty acid diisocyanates containing an average of two isocyanate groups per molecule.

In addition to the low molecular weight polyisocyanates, the so-called chain-extended isocyanates may also be used. Chain-extended polyisocyanates may be obtained by reaction of about x moles of a preferably dihydric alcohol with about x+1 moles of a preferably difunctional diisocyanate.

Instead of the pure components, it is also possible to use technical products which, besides difunctional molecules, also contain molecules with higher or lower functionalities, for example 1 or 3. However, products consisting mostly of difunctional molecules, so that the mixture may be regarded as, on average, difunctional, are preferably used.

The number of isocyanate groups per molecule of the reaction product is typically on average 2 while the molecular weight of the resulting diisocyanate increases with increasing x. In general, x may assume values of 1 to 10,000.

Suitable dihydric alcohols are glycols, such as ethylene glycol, propylene glycol, butylene glycol and higher homologs thereof. Other suitable dihydric alcohols are the dimer alcohols obtainable by dimerization of oleyl alcohols or by reduction of the esters of dimer fatty acid. Alcohols and alcohol cuts which are obtained, for example, by transesterification of triglycerides with monohydric, dihydric or trihydric alcohols and which are on average dihydric, may also be used.

The chain-extended diisocyanates obtainable in this way are generally reacted with monofunctional polyether polyols.

These polyether polyols are preferably the adducts of α-epoxides containing 2 to 24 carbon atoms with monohydric alcohols containing 1 to 24 and preferably 6 to 18 carbon atoms. The resulting polyether polyols may be both homopolymerization and copolymerization products.

The electrophoretic coating baths according to the invention, i.e. the aqueous solutions or dispersions of the cationic electrophoretic coating compositions, may optionally contain other additives, including for example coloring and extending pigments. Coloring pigments are, for example, red iron oxide, titanium dioxide or carbon black and the like while extending pigments are, for example, clay, mica, talcum or calcium carbonate and the like. Other suitable additives are hardening catalysts, for example acetates, naphthenates, oleates, chromates, phosphates and other salts of bismuth, lead, tin, iron, cobalt, nickel, aluminium, zinc, manganese, copper and zirconium. The coating composition according to the invention may also contain another water-soluble, neutral or cationic resin, including for example water-soluble phenolic resins, water-soluble melamine resins, polyacrylamides, polyvinyl alcohol, polyvinyl pyrrolidone, copolymers containing dialkylaminoethyl methacrylate or dialkylaminopropyl methacrylate or adducts of glycidyl methacrylate copolymers and secondary amine.

The binders are normally marketed in a concentrated, highly viscous to paste-like form which contains around 40 to 70% by weight and preferably 45 to 60% by weight of binder and have to be diluted for use. This may be done either in the electrophoretic coating bath itself or in a dilution step preceding the bath.

As already mentioned, the electrophoretic coating baths according to the invention contain an additive for preventing or suppressing foam known as a defoamer, namely the above-mentioned special compounds from the group of nonionic surfactants which are also referred to as PAO compounds. The defoamer may either be present in the concentrated paste-like form of the coating composition or may be correspondingly incorporated therein or, alternatively, may be added during the dilution step. It is also possible in accordance with the invention directly to add the defoamer to the electrophoretic coating bath although, in this case, it is important to ensure that the defoamer is added in a turbulent zone of the bath in order to improve its distribution.

If desired, the electrophoretic coating baths according to the invention may contain other standard additives in addition to the components mentioned above, for example additional solvents, antioxidants, surface-active agents, etc.

The solids content of the electrophoretic coating baths according to the invention is preferably between 7 and 35% by weight and more preferably between 12 and 25% by weight.

The pH value of the electrophoretic coating baths is in the range from 4 to 8 and preferably in the range from 5 to 7.5. The electrophoretic coating baths according to the invention may be used to coat any electrically conductive substrates, but especially metals, such as steel, aluminium, copper and the like. The steel may be galvanized, phosphated, non-phosphated or pretreated in any other way known to the expert.

The temperature of electrophoretic coating bath should be between 15 and 40° C. and is preferably in range from 25 to 35° C.

The voltage applied may vary over a wide range, for example from 2 to 1,000 volts. However, voltages of 50 to 500 volts are typically applied. The current density is generally between about 10 and 3,000 amperes/m$^2$. The current density falls in the course of the deposition process.

On completion of deposition, the coated article is rinsed and is ready for stoving.

The lacquer films deposited are generally stoved for 10 to 16 minutes at temperatures of 130 to 200° C. and, more particularly, for 15 to 30 minutes at temperatures of 50 to 180° C.

PAO compounds of which the hydroxy groups have been largely or completely capped by etherification or esterification with alcohols or carboxylic acids are preferably used for the purposes of the invention.

The polyalkylene oxide compounds to be used in the process according to the invention and in the electrophoretic coating baths according to the invention should have a molecular weight of 300 to 5,000, those with a molecular weight of 400 to 2,000 and, more particularly, 500 to 1,500 being preferred.

The present invention also relates to the use of the PAO compounds described above to control foaming in electrophoretic coating baths used for cationic electrophoretic coating.

The following Examples are intended to illustrate the invention without limiting it in any way.

EXAMPLES

In order to test the effectiveness of the PAO compounds to be used in accordance with the invention in controlling foaming, a commercial electrophoretic coating bath containing various defoamers was stirred and quantities of 100 ml of the defoamer-containing test formulations thus prepared were dropped 100 cm from a standardized measuring cup (DIN 53211) into a 500 ml measuring cylinder at 50° C. The height of the foam formed was then read off at 5-minute intervals over a period of 30 minutes. The results obtained—by comparison with a defoamer-free electrophoretic coating bath—are set out in Table 1.

TABLE 1

| | Foam volume in ml (at 50° C.) | |
|---|---|---|
| | Addition | |
| Measuring time | None | E-1 |
| 0 min. | 100 | 100 |
| 5 mins. | 30 | 10 |
| 10 mins. | 16 | 3 |
| 15 mins. | 12 | 2 |
| 20 mins. | 10 | 2 |
| 25 mins. | 10 | 2 |
| 30 mins. | 9 | 1 |

The test substance E-1 is a PAO compound corresponding to general formula (I) above, in which $R^1$ is a mixture of $C_{12-18}$ fatty alkyl radicals, $R^2$ is an n-butyl radical and n has an average value of 9.

The compatibility of the PAO compounds to be used in accordance with the invention with commercial electrophoretic coating lacquers was positively evaluated in every case. The corresponding evaluations were carried out by coating glass plates mounted in frames. The tendency of the coating to form craters and the flow properties of the coating were evaluated as quality criteria. Excellent compatibility with commercial electrophoretic coating lacquers was observed in particular for PAO compounds corresponding to general formula (I) above. In particular, the coatings obtained using electrophoretic coating baths containing the above-mentioned defoamer E-1 were classified as being of particularly high quality.

What is claimed is:

1. A process for coating an electrically conductive substrate comprising immersing said substrate in a water-based electrophoretic coating bath containing at least one cathodically depositable synthetic resin and a polyalkylene oxide compound whose oxyalkyl groups contain 2 to 4 carbon atoms and the terminal OH groups are esterified with a carboxylic acid or etherified with an allyl or methyl aryl group, connecting said substrate as the cathode, depositing a film of said resin on said substrate by application of direct current, removing the substrate from said electrophoretic coating bath and stoving the deposited film, wherein said polyalkylene oxide compound has a solubility of more than 50 parts by weight in 100 parts by weight of water at 25° C.

2. A process as in claim 1 wherein said polyalkylene oxide compound corresponds to general formula (I):

$$R^1\text{—}O\text{—}(CH_2CH_2O)_n\text{—}R^2 \qquad (I)$$

in which $R^1$ is a linear or branched alkyl or alkenyl radical containing 8 to 18 carbon atoms, $R^2$ is an alkyl radical containing 4 to 8 carbon atoms and n is a number of 7 to 30.

3. A process as in claim 1 wherein said polyalkylene oxide compound is present in a quantity of 0.01% to 15% by weight, based on the solids content of said coating bath.

4. A process for controlling foam in a water-based electrophoretic coating bath for coating an electrically conductive substrate wherein said bath contains at least one cathodically depositable synthetic resin, comprising adding to said bath a polyalkylene oxide compound whose oxyalkyl groups contain 2 to 4 carbon atoms and the terminal OH groups are esterified with a carboxylic acid or etherified with an allyl or methyl aryl group and has a solubility of more than 50 parts by weight in 100 parts by weight of water at 25° C.

5. A process as in claim 4 including immersing said substrate in said coating bath, connecting said substrate as the cathode, depositing a film of said resin on said substrate by application of direct current, removing said substrate from said coating bath and stoving the film deposited on said substrate.

6. A process as in claim 4 wherein said polyalkylene oxide compound corresponds to general formula (I):

$$R^1\text{—}O\text{—}(CH_2CH_2O)_n\text{—}R^2 \qquad (I)$$

in which $R^1$ is a linear or branched alkyl or alkenyl radical containing 8 to 18 carbon atoms, $R^2$ is an alkyl radical containing 4 to 8 carbon atoms and n is a number of 7 to 30.

7. A process as in claim 4 wherein said polyalkylene oxide compound is present in a quantity of 0.01% to 15% by weight, based on the solids content of said coating bath.

8. An electrophoretic coating bath comprising a cathodically depositable synthetic resin and a polyalkylene oxide compound whose oxyalkyl groups contain 2 to 4 carbon atoms and the terminal OH groups are esterified with a carboxylic acid or etherified with an allyl or methyl aryl group and has a solubility of more than 50 parts by weight in 100 parts by weight of water at 25° C.

9. An electrophoretic coating bath as in claim 8 wherein said polyalkylene oxide compound corresponds to general formula (I):

$$R^1\text{—}O\text{—}(CH_2CH_2O)_n\text{—}R^2 \qquad (I)$$

in which $R^1$ is a linear or branched alkyl or alkenyl radical containing 8 to 18 carbon atoms, $R^2$ is an alkyl radical containing 4 to 8 carbon atoms and n is a number of 7 to 30.

10. An electrophoretic coating bath as in claim 8 wherein said polyalkylene oxide compound is present in a quantity of 0.01% to 15% by weight, based on the solids content of said coating bath.

\* \* \* \* \*